US009787741B2

(12) United States Patent
Nair

(10) Patent No.: US 9,787,741 B2
(45) Date of Patent: Oct. 10, 2017

(54) COMMUNICATION DEVICE AND COMMUNICATION METHOD

(71) Applicant: Kabushiki Kaisha Toshiba, Minato-ku, Tokyo (JP)

(72) Inventor: Prashob Nair, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 485 days.

(21) Appl. No.: 14/341,627

(22) Filed: Jul. 25, 2014

(65) Prior Publication Data

US 2015/0006673 A1 Jan. 1, 2015

Related U.S. Application Data

(63) Continuation of application No. PCT/JP2013/067831, filed on Jun. 28, 2013.

(51) Int. Cl.
*G06F 15/16* (2006.01)
*H04L 29/06* (2006.01)
(Continued)

(52) U.S. Cl.
CPC ........... *H04L 65/602* (2013.01); *G09G 5/006* (2013.01); *H04L 12/2809* (2013.01);
(Continued)

(58) Field of Classification Search
CPC . H04L 12/2809; H04L 65/602; H04L 65/607; H04L 65/80; H04L 51/14;
(Continued)

(56) References Cited

U.S. PATENT DOCUMENTS 8,375,147 B2 2/2013 Kamohara
8,429,299 B2 4/2013 Chan et al.
(Continued)

FOREIGN PATENT DOCUMENTS

JP 2009-284403 A 12/2009
JP 2011-035797 A 2/2011
(Continued)

OTHER PUBLICATIONS

An English Translation of International Preliminary Report on Patentability mailed by the International Bureau of WIPO on Jan. 7, 2016 in the corresponding PCT application No. PCT/JP2013/067831—6 pages.

*Primary Examiner* — Benjamin M Thieu
(74) *Attorney, Agent, or Firm* — Knobbe, Martens, Olson & Bear LLP

(57) ABSTRACT

[Problem] To provide a communication device capable of properly identifying a communication partner device.
[Solution to Problem] A communication device 1 includes: a connection detector 3 which detects that the communication device is connected to a communication partner device, using a specific communication interface; a specific information acquisition unit 4 which acquires specific information including at least one of specific time information and a specific message, when the connection with the communication partner device is detected by the connection detector; a packet generator 5 which generates a packet including the specific information; and a broadcaster 6 which broadcasts the packet through a network.

17 Claims, 12 Drawing Sheets

(51) Int. Cl.
| | |
|---|---|
| *H04N 5/765* | (2006.01) |
| *H04N 21/236* | (2011.01) |
| *H04N 21/4363* | (2011.01) |
| *H04N 21/647* | (2011.01) |
| *H04N 21/8547* | (2011.01) |
| *H04L 12/28* | (2006.01) |
| *G09G 5/00* | (2006.01) |
| *H04L 12/58* | (2006.01) |
| *H04L 29/12* | (2006.01) |
| *G06F 3/14* | (2006.01) |

(52) U.S. Cl.
CPC ............ *H04L 65/607* (2013.01); *H04L 65/80* (2013.01); *H04N 5/765* (2013.01); *H04N 21/23608* (2013.01); *H04N 21/43635* (2013.01); *H04N 21/647* (2013.01); *H04N 21/8547* (2013.01); *G06F 3/14* (2013.01); *G09G 2350/00* (2013.01); *G09G 2370/042* (2013.01); *G09G 2370/045* (2013.01); *G09G 2370/06* (2013.01); *G09G 2370/10* (2013.01); *G09G 2370/12* (2013.01); *G09G 2370/16* (2013.01); *G09G 2370/22* (2013.01); *H04L 51/14* (2013.01); *H04L 61/6022* (2013.01)

(58) Field of Classification Search
CPC ..... H04L 61/6022; H04L 29/08; H04N 5/765; H04N 21/43635; H04N 21/647; H04N 21/8547; H04N 21/23608; G09G 5/006; G09G 2370/22; G09G 2350/00; G09G 2370/042; G09G 2370/045; G09G 2370/06; G09G 2370/10; G09G 2370/12; G09G 2370/16; G06F 3/14
See application file for complete search history.

(56) References Cited

U.S. PATENT DOCUMENTS

| | | | |
|---|---|---|---|
| 8,661,448 B2* | 2/2014 | Ashish | G06F 9/5077 718/104 |
| 8,661,488 B2 | 2/2014 | Matsuyama | |
| 2010/0073560 A1* | 3/2010 | Kitano | G09G 5/006 348/554 |
| 2010/0088733 A1 | 4/2010 | Chan et al. | |
| 2010/0194983 A1* | 8/2010 | Iguchi | G08C 17/00 348/563 |
| 2010/0263006 A1 | 10/2010 | Matsuyama | |
| 2011/0285916 A1 | 11/2011 | Takiduka | |
| 2014/0028875 A1* | 1/2014 | Hara | H04N 5/77 348/231.5 |
| 2014/0067828 A1* | 3/2014 | Archibong | H04L 65/4084 707/748 |
| 2014/0369396 A1* | 12/2014 | Tanaka | H04B 3/46 375/228 |

FOREIGN PATENT DOCUMENTS

| | | |
|---|---|---|
| JP | 2011-244391 A | 12/2011 |
| JP | 2012-504918 A | 2/2012 |
| JP | 2013-085051 A | 5/2013 |
| WO | WO 2009/016936 A1 | 2/2009 |

* cited by examiner

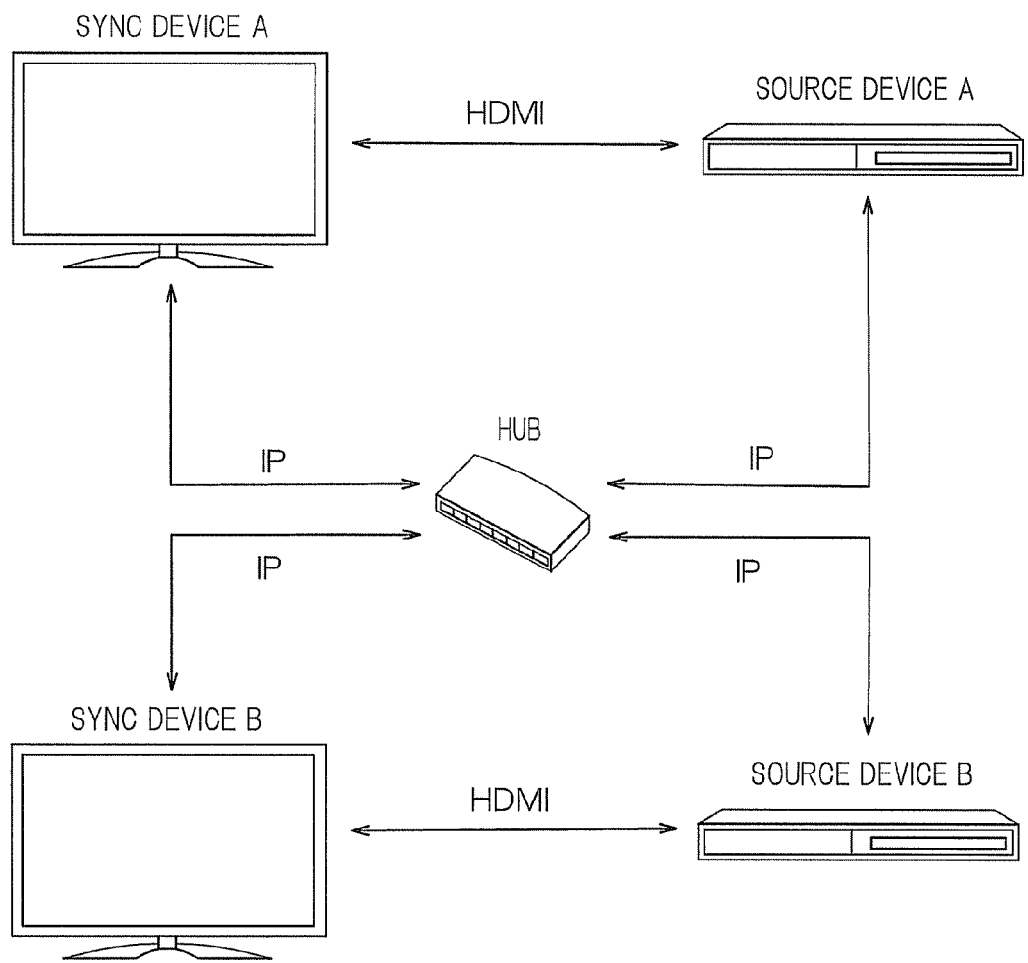
F I G. 3

COMMUNICATION DEVICE AND COMMUNICATION METHOD

CROSS-REFERENCE TO RELATED APPLICATIONS

This application is based upon and claims the benefit of priority from the prior PCT application No. PCT/JP2013/067831, filed on Jun. 28, 2013, the entire contents of which are incorporated herein by reference.

TECHNICAL FIELD

Embodiments of the present invention relate to a communication device and a communication method for communicating with a communication partner device.

BACKGROUND ART

When a source device and a sync device are connected through a specific communication interface such as HDMI (High-Definition Multimedia Interface), each device cannot properly identify the MAC address of a communication partner device connected thereto through HDMI.

Further, when a sync device such as TV receives content from a source device such as a recorder, it is required to determine which communication interface or protocol should be used. Particularly, when many communication interfaces and protocols are prepared for the connection between the source device and sync device, it is a great burden for the user to select the optimum interface/protocol. The user may possibly select an inappropriate communication interface or protocol which leads to deterioration in the playback quality of content. However, the communication interface or protocol to be selected should not be fixed since the optimum communication interface or protocol changes depending on the performance of the source device and sync device, content type, communication environment, etc.

CITATION LIST

Patent Literature

[Patent Literature 1] JP-A 2011-244391 (Kokai)

SUMMARY OF INVENTION

Technical Problem

Embodiments of the present invention have been made to provide a communication device and a communication method capable of properly identifying a communication partner device.

Solution to Problem

The present embodiment provides a communication device including:

a connection detector which detects that the communication device is connected to a communication partner device, using a specific communication interface;

a specific information acquisition unit which acquires specific information including at least one of specific time information and a specific message, when the connection with the communication partner device is detected by the connection detector;

a packet generator which generates a packet including the specific information; and a broadcaster which broadcasts the packet through a network.

BRIEF DESCRIPTION OF DRAWINGS

FIG. 3 A diagram showing an example of how to connect the communication device 1 and communication partner device 11.

DESCRIPTION OF EMBODIMENTS

Figure 1:
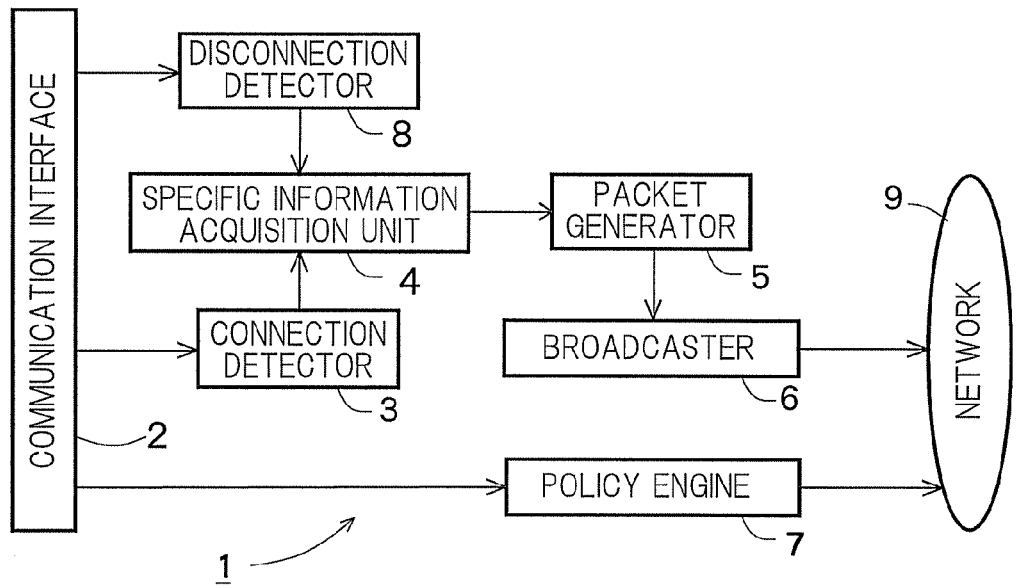
FIG. 1 A block diagram showing a schematic configuration of a communication device 1 according to an embodiment.

Hereinafter, embodiments of the present invention will be explained referring to the drawings.

FIG. 1 is a block diagram showing a schematic configuration of a communication device 1 according to an embodiment. The communication device 1 of FIG. 1 has a communication interface 2, a connection detector 3, a specific information acquisition unit 4, a packet generator 5, a broadcaster 6, a policy engine 7, and a disconnection detector 8.

The communication interface 2 transmits and receives signals through a communication interface such as HDMI and MHL (Mobile High Definition Link).

The connection detector 3 detects that the communication device 1 is connected to a communication partner device, using a specific communication interface. The specific information acquisition unit 4 acquires specific information including at least specific time information or specific message information, when the connection with the communication partner device is detected by the connection detector 3. The packet generator 5 generates a packet including the specific information. The broadcaster 6 broadcasts the packet through a network 9.

The policy engine 7 selects a specific communication interface or protocol to be used to transfer content between the communication device 1 and the communication partner device. The policy engine 7 may be provided in the communication partner device, instead of in the communication device 1. Instead, the policy engine 7 may be provided in each of the communication device 1 and the communication partner device.

For example, the communication device 1 of FIG. 1 is any one of a source device and a sync device, and the other is the communication partner device.

The specific communication interface is e.g. HDMI or MHL (Mobile High Definition Link), but another communication interface (such as DisplayPort) may be used instead. In the explanation to be given below, the specific communication interface is HDMI for simplification.

The specific information is e.g. information relating to the time when the communication device 1 is connected to the communication partner device through HDMI.

In the present embodiment, the communication device 1 broadcasts a packet containing the specific information including information on the time when the communication device 1 is connected to the communication partner device through HDMI. The communication partner device connected through HDMI receives the packet, compares the time information in the specific information contained in this packet with time information previously obtained by itself, and recognizes, if these match each other, that the communication device 1 which broadcasted the packet matches the communication device 1 connected through HDMI. By performing a similar process, the communication device 1 also can properly identify the communication partner device connected thereto through HDMI.

Figure 2:
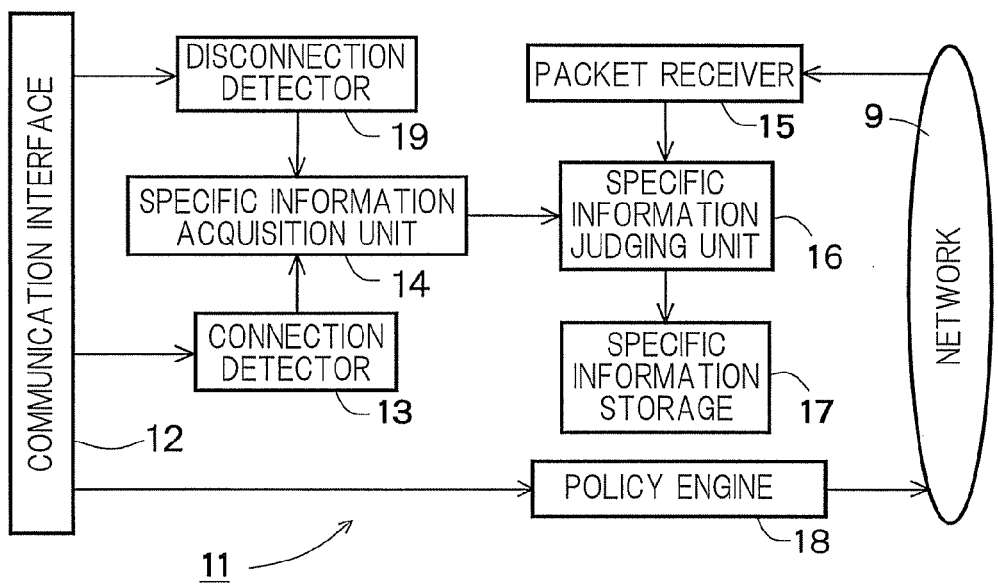
FIG. 2 A block diagram showing a schematic configuration of a communication partner device 11 according to an embodiment.

FIG. 2 is a block diagram showing a schematic configuration of a communication partner device 11 according to an embodiment. The communication partner device 11 of FIG. 2 can be connected to the communication device 1 of FIG. 1 through a communication interface such as HDMI and MHL. The communication partner device 11 of FIG. 2 is a sync device when the communication device 1 of FIG. 1 is a source device, or a source device when the communication device 1 of FIG. 1 is a sync device.

The communication partner device 11 of FIG. 2 has a communication interface 12, a connection detector 13, a specific information acquisition unit 14, a packet receiver 15, a specific information judging unit 16, a specific information storage 17, a policy engine 18, and a disconnection detector 19.

The connection detector 13 detects that the communication partner device 11 is connected to the communication device 1, using a specific communication interface. The specific information acquisition unit 14 acquires specific information including at least specific time information or a specific message, when the connection with the communication device 1 is detected by the connection detector 13. The packet receiver 15 receives a packet transmitted from the communication device 1, and extracts the specific information, MAC address, etc. from the packet. The specific information judging unit 16 judges whether the specific information included in the packet matches the specific information previously acquired by the specific information acquisition unit 14. The specific information storage 17 discards the packet received by the packet receiver 15 when the judgment by the specific information judging unit 16 results in a mismatch, and stores information on a correspondence relationship between the specific information and the communication interface when the judgment by the specific information judging unit 16 results in a match. The policy engine 18 performs a process similar to that performed by the policy engine 7 of FIG. 1.

Note that the communication device 1 of FIG. 1 may have the same components as those of the communication partner device 11 of FIG. 2. Similarly, the communication partner device 11 of FIG. 2 may have the same components as those of the communication device 1 of FIG. 1.

FIG. 3 is a diagram showing an example of how to connect the communication device 1 and communication partner device 11. In the example of FIG. 3, sync device A and source device A are connected through HDMI, and sync device B and source device B are connected through another HDMI. These four devices are connected to the network 9 through a hub. These four devices can transmit and receive IP packets through the network 9.

For example, sync device A or B of FIG. 3 corresponds to the communication device 1 of FIG. 1, and source device A or B corresponds to the communication partner device 11 of FIG. 2.

Figure 4:
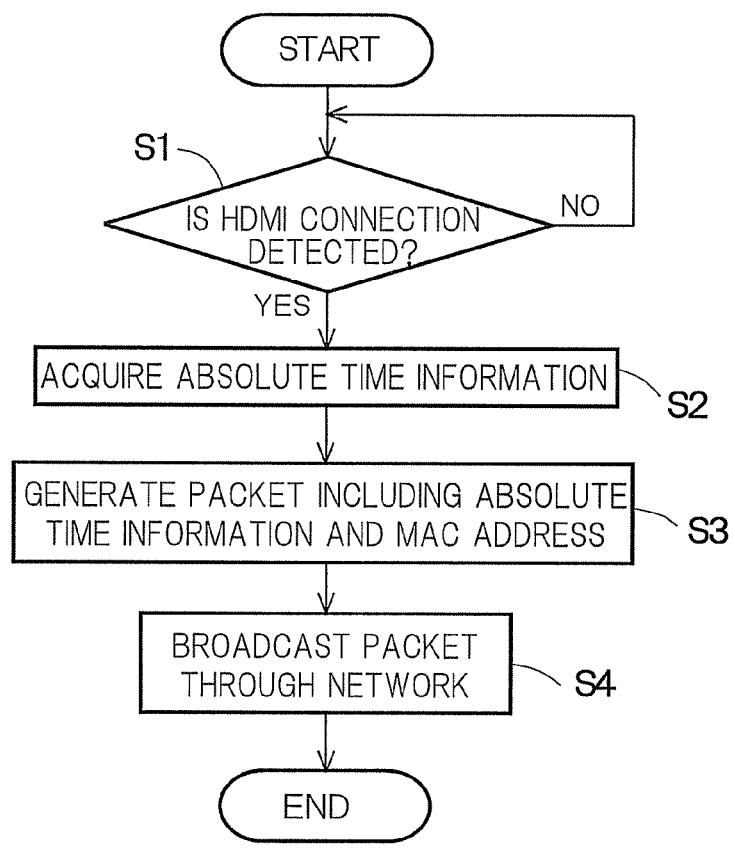
FIG. 4 A flow chart showing a first example of the operating procedure performed by the communication device 1.

FIG. 4 is a flow chart showing a first example of the operating procedure performed by the communication device 1. First, the connection detector 3 judges whether the communication device 1 is connected to the communication partner device 11 through HDMI (Step S1). The flow remains at Step S1 until the HDMI connection is detected. When the communication device 1 and communication partner device 11 are connected through an HDMI cable, an HPD (Hot Plug Detection) signal is transmitted and received between the devices. In this way, the devices recognize that these are connected through the HDMI cable.

When the communication device 1 is connected to the communication partner device 11 through HDMI, the specific information acquisition unit 4 in the communication device 1 accesses e.g. an NTP (Network Time Protocol) server through the network 9 to acquire absolute time information (i.e. standard time information) indicative of the time when the communication device 1 is connected to the communication partner device 11 through HDMI (Step S2). At this time, the communication partner device 11 also accesses the NTP server to acquire and store the absolute time information.

The reason why the absolute time information is acquired at Step S2 is that the absolute time information can be used as reference information for synchronizing all devices.

For example, when the source device (communication partner device 11) is connected to the sync device (communication device 1) through HDMI at absolute time t, the sync device asserts an HPD signal through HDMI and the source device can detect that the HPD signal was asserted by the sync device. In this way, the source device grasps that it has been connected to the sync device at the absolute time t. In the present embodiment, it is assumed that the source device notifies the sync device about the absolute time t through an IP layer. In the case of MHL, the absolute time t may be the time when the source device finds the sync device shifting from Discovery stage to On stage.

The absolute time information is acquired at Step S2 in order to confirm whether the source device and sync device have common time information in the connection process.

Note that the absolute time information is not always acquired at the time when the HDMI cable is connected. This is because the source device and sync device are not always connected to the HDMI cable at the same timing. Thus, the absolute time information may be acquired at the point immediately after both of the source device and sync device are connected to the HDMI cable, or may be acquired after a predetermined time has passed from that point. The same can be applied to a communication interface different from HDMI, such as MHL.

The above HPD signal can be used to recognize the point when both of the source device and sync device are connected to the HDMI cable. The communication device 1 may acquire the absolute time information when this HPD signal is asserted, or when the HPD signal reaches a predetermined signal level. As stated above, when to acquire the absolute time information is determined depending on the specifications of the communication interface.

After the absolute time information is acquired at Step S2 in FIG. 4, the packet generator 5 in the communication device 1 generates a packet including the acquired absolute time information and identification information on the communication device 1 itself (Step S3). The identification information on the communication device 1 itself is e.g. a MAC address. Further, the packet to be generated is e.g. an IP packet.

Figure 5:
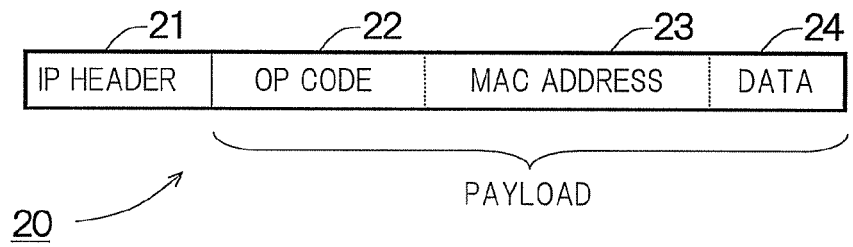
FIG. 5 A diagram showing a data structure of an IP packet 20.

FIG. 5 is a diagram showing a data structure of an IP packet 20. As shown in FIG. 5, the IP packet 20 includes an IP header 21, an operation code (OP code) 22, a MAC address 23, and data 24. The above absolute time information is included in the data. In FIG. 5, the MAC address 23 inserted in the payload of the packet should not necessarily be inserted in the payload since the MAC address 23 is included in the data 24.

After the packet is generated at Step S3 in FIG. 4, the broadcaster 6 in the communication device 1 broadcasts the packet through the network 9 (Step S4). The communication partner device receives the broadcasted packet, and if the absolute time information acquired by itself at Step S2 matches the absolute time information included in the packet, the communication partner device 11 recognize that the communication device 1 connected to itself through HDMI is the same as the communication device 1 which broadcasted the packet. Further, since the received packet includes the MAC address of the communication device 1, the communication partner device 11 can identify the communication device 1 connected to itself through HDMI.

The process of FIG. 4 may be performed by the communication partner device 11 connected to the communication device 1 through HDMI. That is, the communication partner device 11 may generate a packet including absolute time information, and broadcast it through the network 9. If the process of FIG. 4 is performed by both of the communication device 1 and communication partner device 11 connected through HDMI, the communication device 1 can identify the communication partner device 11, and the communication partner device 11 can identify the communication device 1.

In the example shown in FIG. 5, the packet to be broadcasted includes the MAC address, but other identification information such as UUID (Universal Unique Identifier) may be included instead of the MAC address. Further, the communication device 1 connected through HDMI can be identified even when the packet does not include any information for identifying the communication device 1 itself. This is because if the communication partner can identify the communication device 1 by the absolute time information, HDMI communication therebetween can be achieved.

Figure 6:
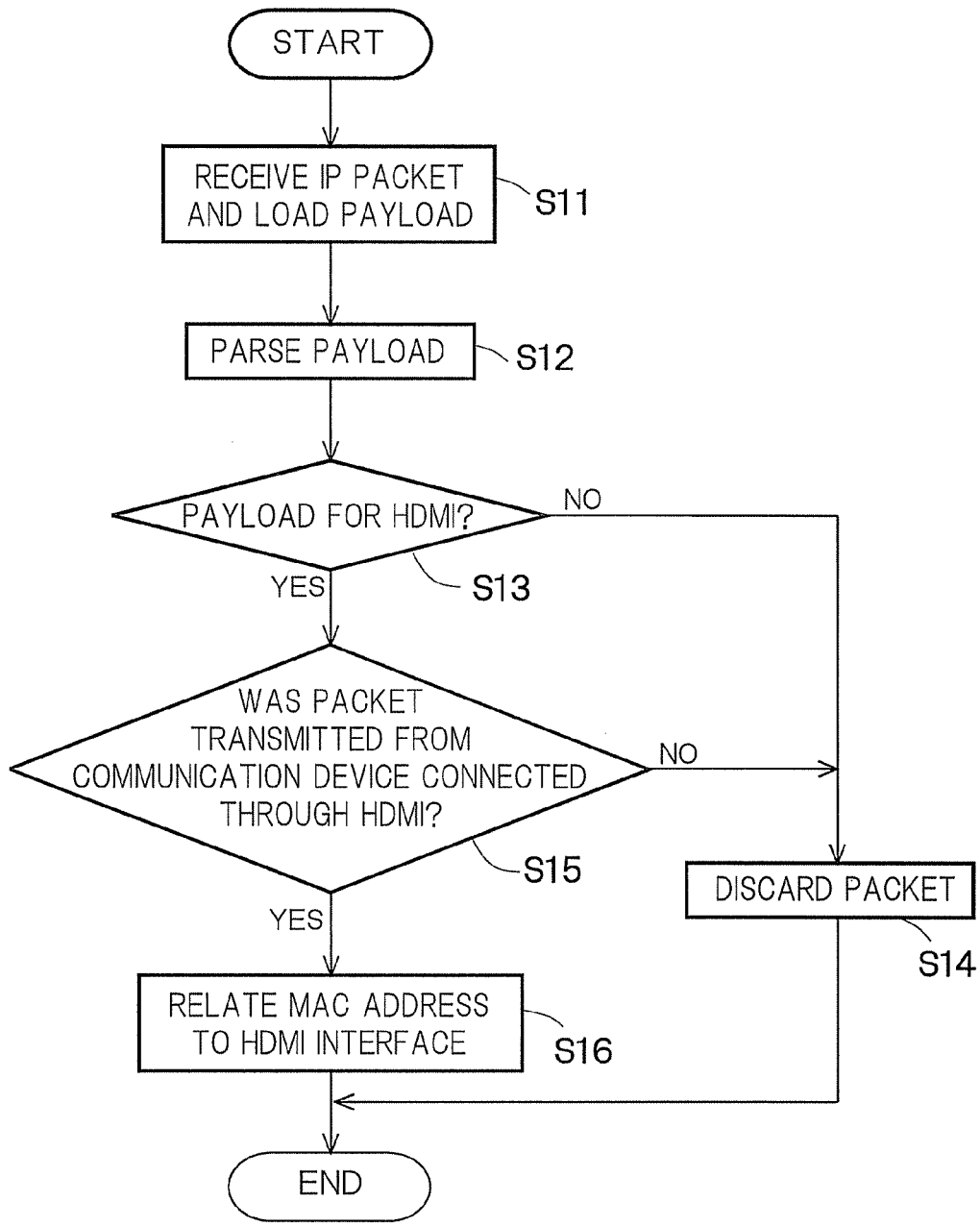
FIG. 6 A flow chart showing an example of the operating procedure performed by the communication partner device 11 when receiving a packet broadcasted by the communication device 1.

FIG. 6 is a flow chart showing an example of the operating procedure performed by the communication partner device 11 when receiving a packet broadcasted by the communication device 1. First, the specific information acquisition unit 14 in the communication partner device 11 (e.g. sync device) receives the IP packet and loads the payload included in the IP packet (Step S11). Then, the payload is parsed (Step S12).

Next, the specific information judging unit 16 judges whether the payload included in the received IP packet relates to an HDMI interface (Step S13). If the payload does not relate to an HDMI interface, the specific information judging unit 16 discards the packet (Step S14). If the payload relates to an HDMI interface, the specific information judging unit 16 judges whether the received IP packet was transmitted from the communication device 1 connected through HDMI (Step S15). As shown in FIG. 5, the payload of the IP packet includes the MAC address and data. By comparing the absolute time information included in the data with the absolute time information previously obtained by the communication partner device 11, whether the transmitter of the IP packet is the same as the device connected through HDMI can be easily discerned.

At Step S15, if it is judged that the transmitter of the IP packet is not the same as the device connected through HDMI, the IP packet is discarded (Step S14). If it is judged that the receiver of the IP packet is the same as the device connected through HDMI, the specific information is stored in the specific information storage 17, and the MAC address of the communication device 1 included in the IP packet is related to the HDMI interface (Step S16).

When the communication partner device 11 is connected to the communication device 1 using a protocol such as DLNA and Miracast, the communication partner device 11 can identify the MAC address of the partner device when the connection using that protocol is established. Further, when using a protocol such as DLNA and Miracast enabled on an interface such as Wi-Fi and wired LAN, the MAC address of each partner device can be acquired when a plurality of devices are connected. In other words, when the communication partner device 11 is connected to the communication device 1 using a protocol such as DLNA and Miracast, the communication partner device 11 can discern that the communication device 1 is compatible with DLNA and Miracast, and can relate the MAC address of the communication device 1 to DLNA and Miracast. Subsequently, when the connection between the communication device 1 and communication partner device 11 is established through Wi-Fi or wired LAN, the communication partner device 11 acquires the MAC address of the communication device 1 and discerns that a protocol such as DLNA and Miracast is available.

Specifically, the communication partner device 11 can relate the MAC address of the communication device 1 to one or more protocols currently being available. By discerning the MAC address of the device connected through HDMI using the above flow, the MAC address of the communication device 1 can be related to protocols and interfaces. When transferring a video to the communication device 1, the communication partner device 11 can select one of these protocols and interfaces as a system fitting a policy.

In the example shown in FIG. 4, both of the communication device 1 and communication partner device 11 acquire absolute time information when an HDMI connection is detected. However, instead of acquiring the absolute time information, the communication device 1 may transmit, to the communication partner device 11, a VSC (Vendor Specific Command) for HDMI-CEC (Consumer Electronics Control) to request the time information managed by the communication partner device 11. The VSC for HDMI-CEC is a command used to transmit a specific command between devices connected through HDMI so that a device receiving the command gives a response depending on the command. The specific command in the present embodiment requests the device receiving this command to return the time information managed thereby, as a response.

Figure 7:
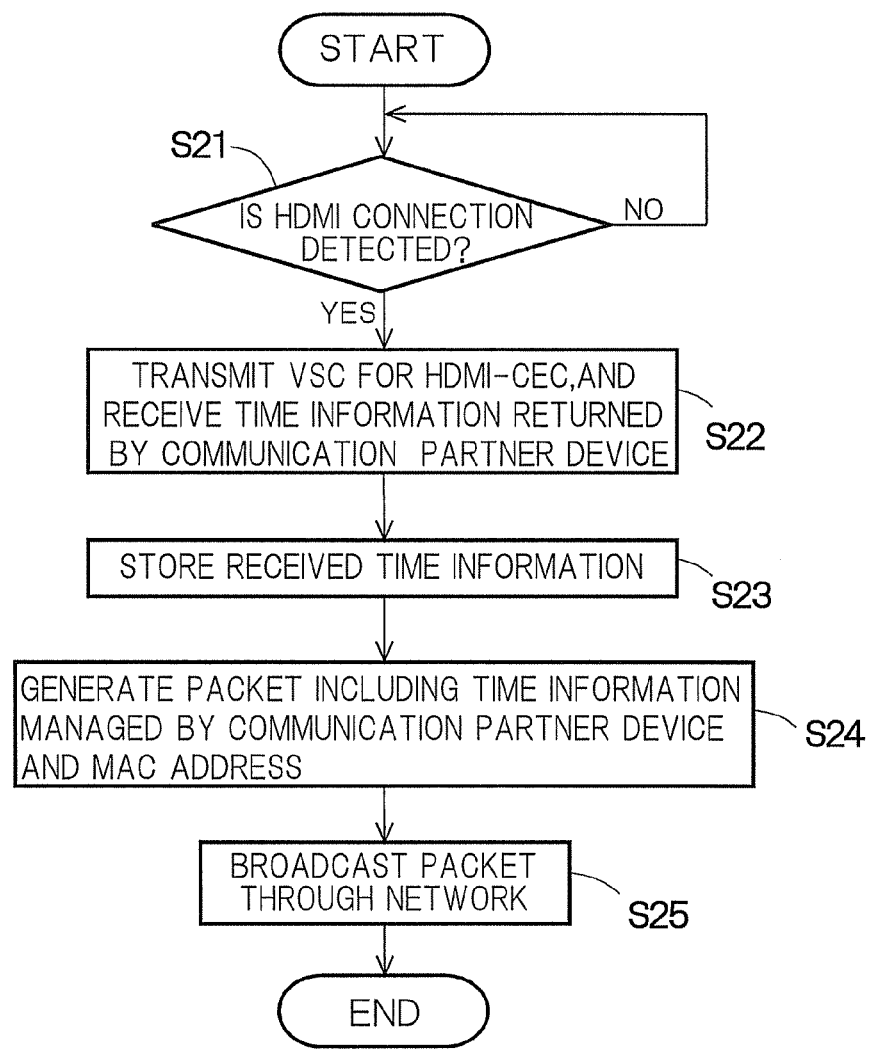
FIG. 7 A flow chart showing an example of the operating procedure performed by the communication device 1 when requesting time information managed by the communication partner device 11, using a VSC for HDMI-CEC.

FIG. 7 is a flow chart showing an example of the operating procedure performed by the communication device 1 when requesting time information managed by the communication partner device 11, using a VSC for HDMI-CEC. When it is detected that the communication device 1 is connected to the communication partner device 11 through HDMI (Step S21), the communication device 1 transmits a VSC for HDMI-CEC to the communication partner device 11 (e.g. sync device) through HDMI. Upon receiving this command, the communication partner device 11 transmits the time information managed by the communication partner device 11 through HDMI, and the communication device 1 receives the time information (Step S22). The communication device 1 stores the received time information managed by the communication partner device 11 in a specific information storage (not shown) (Step S23).

The time information managed by the communication partner device 11 is time information which can be arbitrarily set by the communication partner device 11. For example, it may be information indicative of the time when the communication partner device 11 receives, from the communication device 1, a VSC for HDMI-CEC, or may be information indicative of the time when the communication partner device 11 asserts an HPD signal.

Next, the communication device 1 generates an IP packet including the MAC address of itself and the time information managed by the communication partner device 11 (Step S24). Next, the communication device 1 broadcasts the generated IP packet through the network 9 (Step S25). Then, similarly to the process of FIG. 6, the communication partner device 11 receives the broadcasted IP packet, discerns whether the time information included in the IP packet matches the time information transmitted from itself to the communication device 1, and relates the MAC address to the HDMI interface if a match is found.

Since not all devices can utilize HDMI-CEC, a device unable to utilize HDMI-CEC should acquire absolute time information, as shown in FIG. 6.

The VSC for HDMI-CEC is not limited to a command for requesting the time information managed by the communication partner device 11. For example, it may be a command for requesting the communication partner device 11 to transmit specific message information. The operating procedure to be performed in this case can be shown as a flow chart of FIG. 8, for example.

Figure 8:
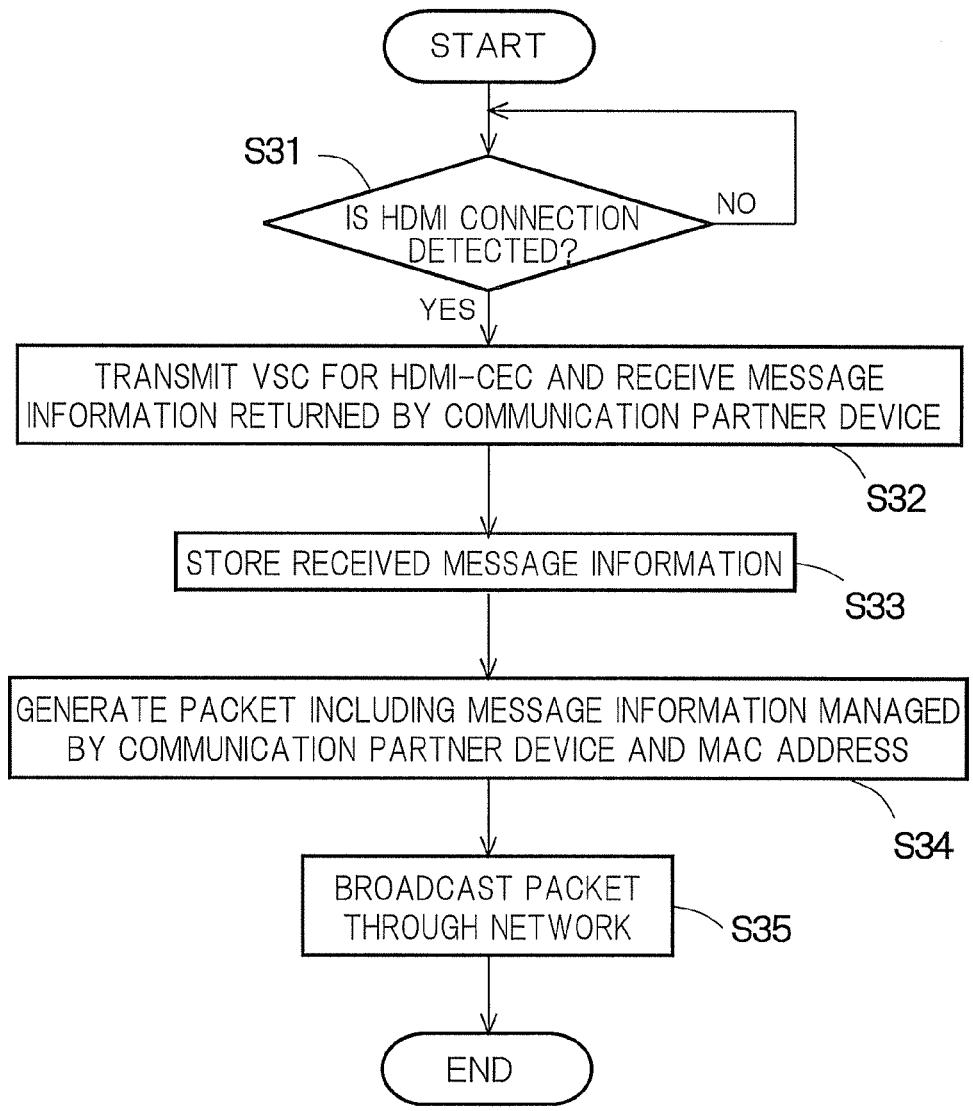
FIG. 8 A flow chart showing a modification example derived from FIG. 7.

In the flow chart of FIG. 8, when an HDMI connection is detected (Step S31), the communication device 1 transmits a VSC for HDMI-CEC to the communication partner device 11 through HDMI, and the communication partner device 11 receives this command and transmits specific message information to the communication device 1 through HDMI (Step S32). Note that the communication partner device 11 generates and transmits different message information each time the HDMI connection is detected. Then, the communication device 1 stores this specific message information in the storage (not shown) (Step S33). Next, the communication device 1 generates an IP packet including the MAC address of itself and the specific message information (Step S34), and broadcasts the generated IP packet through the network 9 (Step S35). Then, similarly to the process of FIG. 6, the communication partner device 11 receives the broadcasted IP packet, discerns whether the message information included in the IP packet matches the message information transmitted from itself to the communication device 1, and relates the MAC address to the HDMI interface if a match is found.

In the above process, the communication partner device 11 can relate the MAC address of the communication device 1 to the HDMI interface, but the communication device 1 cannot relate the MAC address of the communication partner device 11 to the HDMI interface. Accordingly, after performing the above process, the communication device 1 and communication partner device 11 may carry out the above process reversing their roles. That is, the communication devices 1 and communication partner device 11 may have the components shown in FIGS. 2 and 1 respectively.

Further, when transmitting time information or message information responding to the VSC for HDMI-CEC, the communication partner device 11 may broadcast a packet including the time information or message information. In this case, the packet has a structure similar to that shown in FIG. 5. When the time information or message information received through HDMI-CEC matches the time information or message information included in the broadcasted packet, the communication device 1 relates the MAC address of the communication partner device 11 included in the packet to the HDMI interface.

Explained in each of FIGS. 4, 7, and 8 is a process for identifying the communication partner device 11 connected through HDMI, which can also be applied to a process for identifying the communication partner device 11 disconnected from the HDMI connection.

Figure 9:
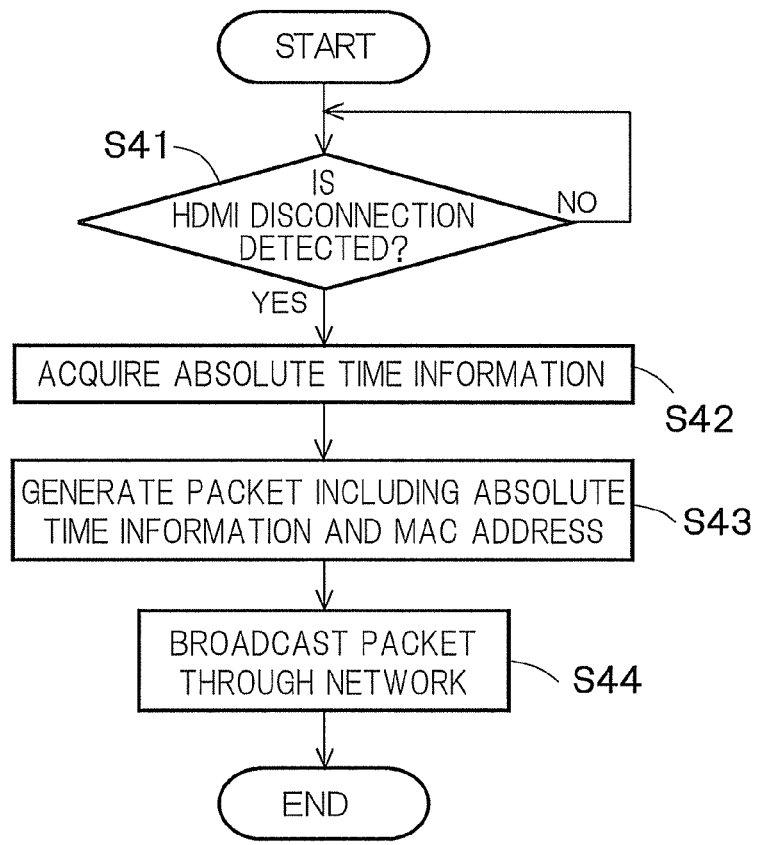
FIG. 9 A flow chart showing an example of the operating procedure performed when disconnecting the HDMI connection corresponding to FIG. 4.

FIG. 9 is a flow chart showing an example of the operating procedure performed when disconnecting the HDMI connection corresponding to FIG. 4. When the disconnection detector 8 in the communication device 1 detects that an HDMI connection is disconnected by e.g. the above HPD command (Step S41), the specific information acquisition unit 4 accesses e.g. an NTP server (not shown) to acquire absolute time information (Step S42). Next, the packet generator 5 generates an IP packet including the acquired absolute time information and the MAC address of the communication device 1 itself (Step S43). Then, the broadcaster 6 broadcasts the generated IP packet through the network 9 (Step S44).

Figure 10:
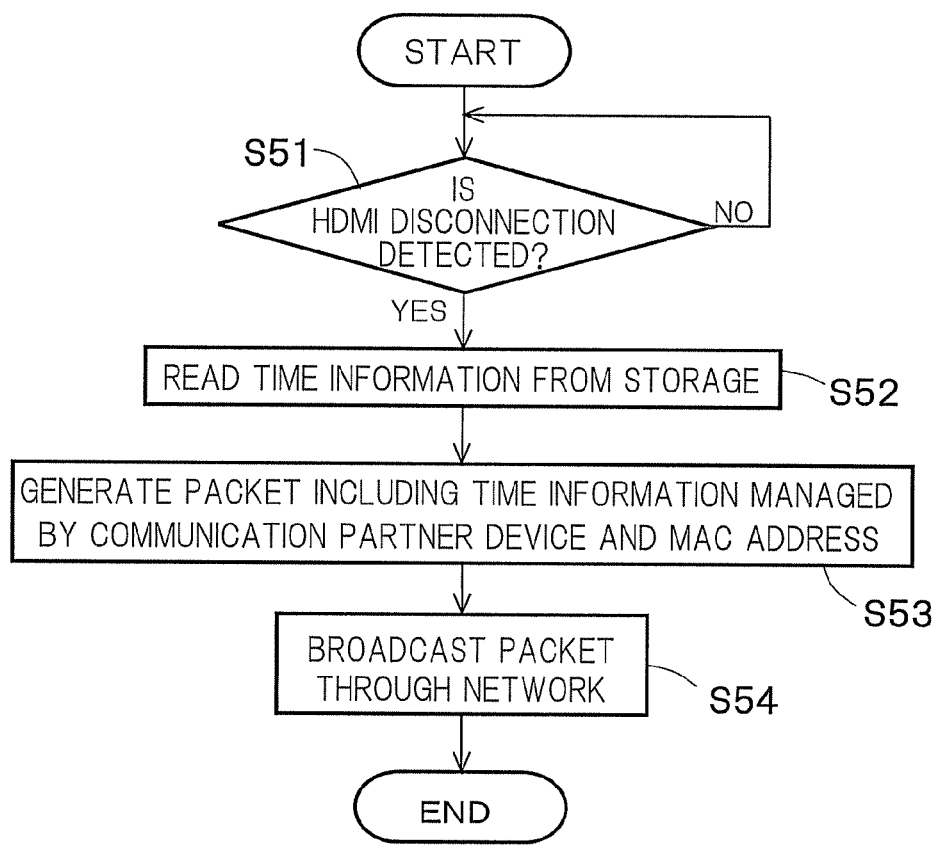
FIG. 10 A flow chart showing an example of the operating procedure performed when disconnecting the HDMI connection corresponding to FIG. 7.

FIG. 10 is a flow chart showing an example of the operating procedure performed when disconnecting the HDMI connection corresponding to FIG. 7. When disconnection of an HDMI connection is detected (Step S51), the communication device 1 reads the time information managed by the communication partner device 11, which was stored in the storage at Step S23 in FIG. 7 (Step S52). Next, the communication device 1 generates an IP packet including the read time information and the MAC address of the communication device 1 itself (Step S53), and broadcasts the generated IP packet through the network 9 (Step S54).

Figure 11:
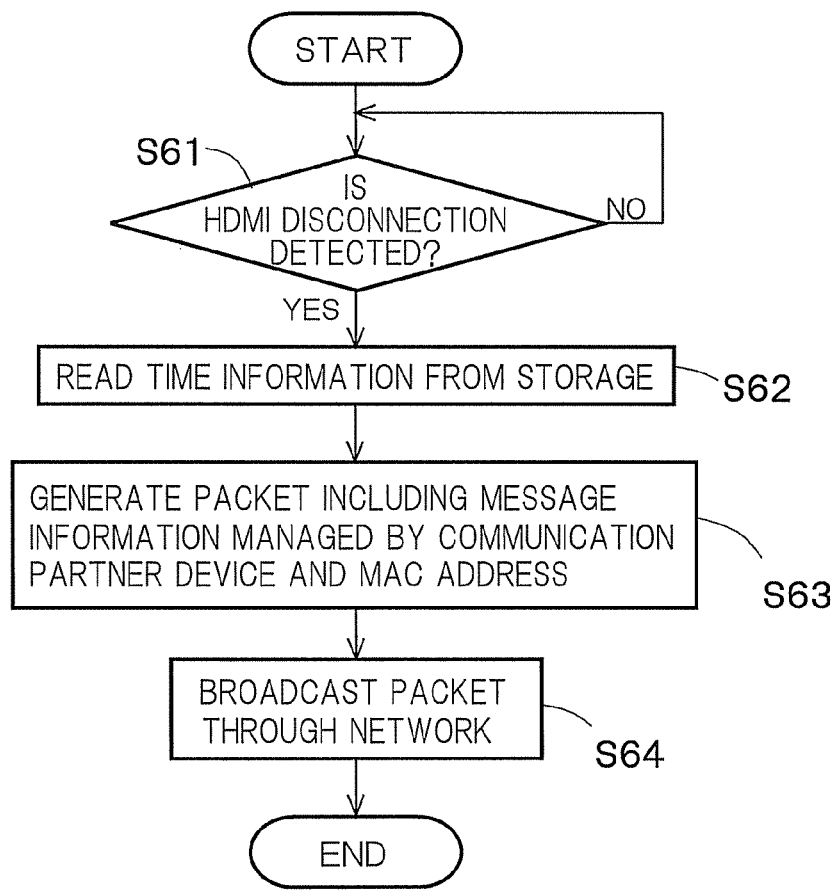
FIG. 11 A flow chart showing an example of the operating procedure performed when disconnecting the HDMI connection corresponding to FIG. 8.

FIG. 11 is a flow chart showing an example of the operating procedure performed when disconnecting the HDMI connection corresponding to FIG. 8. When disconnection of an HDMI connection is detected (Step S61), the communication device 1 reads the specific message information managed by the communication partner device 11, which was stored in the storage at Step S33 in FIG. 8 (Step S62). Next, the communication device 1 generates an IP packet including the read time information and the MAC address of the communication device 1 itself (Step S63), and broadcasts the generated IP packet through the network 9 (Step S64).

After the communication device 1 and communication partner device 11 connected through HDMI successfully identify each other by performing the process of FIG. 4, 7 or 8, a specific communication interface or protocol for transferring content is determined. This process is performed by the policy engine 7, 18 shown in FIGS. 1 and 2.

FIG. 1 is a block diagram showing an example of the internal configuration of the policy engine 7. The policy engine 7 of FIG. 1 is provided in the communication device 1. The policy engine 18 provided in the communication partner device 11 can be formed similarly to the policy engine 7.

Figure 12:
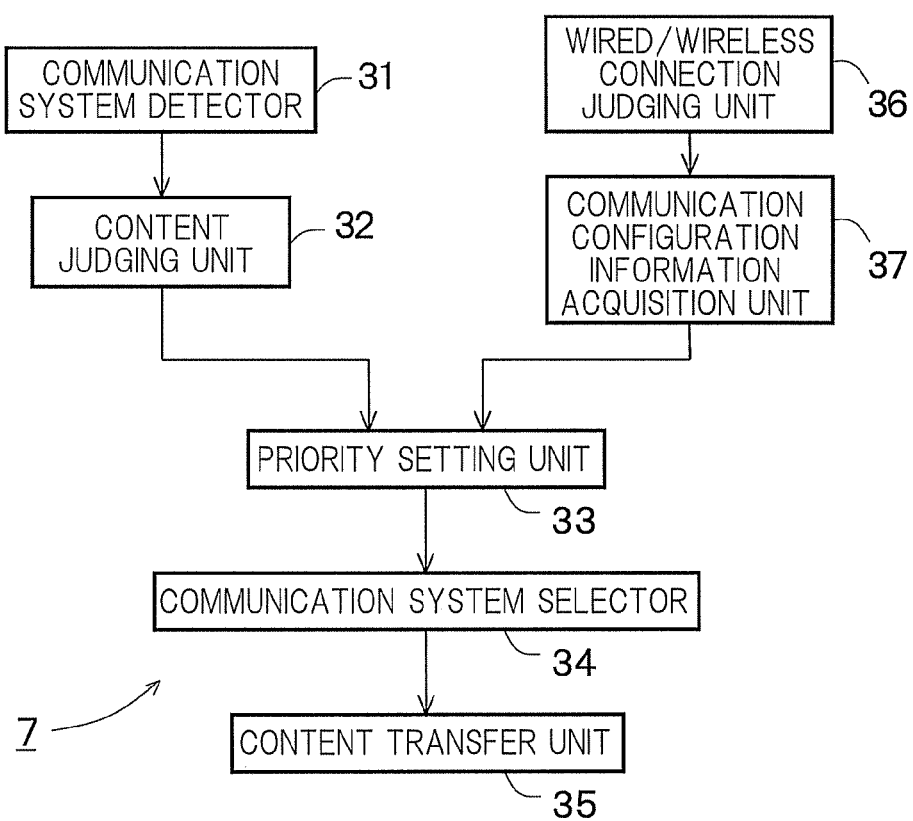
FIG. 12 A block diagram showing an example of the internal configuration of a policy engine 7.

As shown in FIG. 12, the policy engine 7 of FIG. 1 has a communication system detector 31, a content judging unit 32, a priority setting unit 33, a communication system selector 34, a content transfer unit 35, a wired/wireless connection judging unit 36, and a communication configuration information acquisition unit 37.

The communication system detector 31 detects all communication interfaces and protocols available to transfer content to the communication partner device 11. The content judging unit 32 selects each of the communication interfaces and protocols detected by the communication system detector 31 to judge whether the selected communication interface or protocol can properly protect and encode the content to be transferred to the communication partner device 11.

The priority setting unit 33 sets priorities on the respective communication interfaces and protocols judged by the content judging unit 32 to be able to properly protect and encode the content to be transferred to the communication partner device 11. The communication system selector 34 selects, based on the priorities, one of the communication interfaces and protocols judged by the content judging unit 32 to be able to properly protect and encode the content. The content transfer unit 35 transfers the content to the communication partner device 11 using the communication interface or protocol selected by the communication system selector 34. The wired/wireless connection judging unit 36 judges whether the content should be transferred through a wired connection or a wireless connection. The communication configuration information acquisition unit 37 acquires communication configuration information suitable for the wired or wireless connection, based on a judgment result obtained by the wired/wireless connection judging unit 36.

Figure 13:
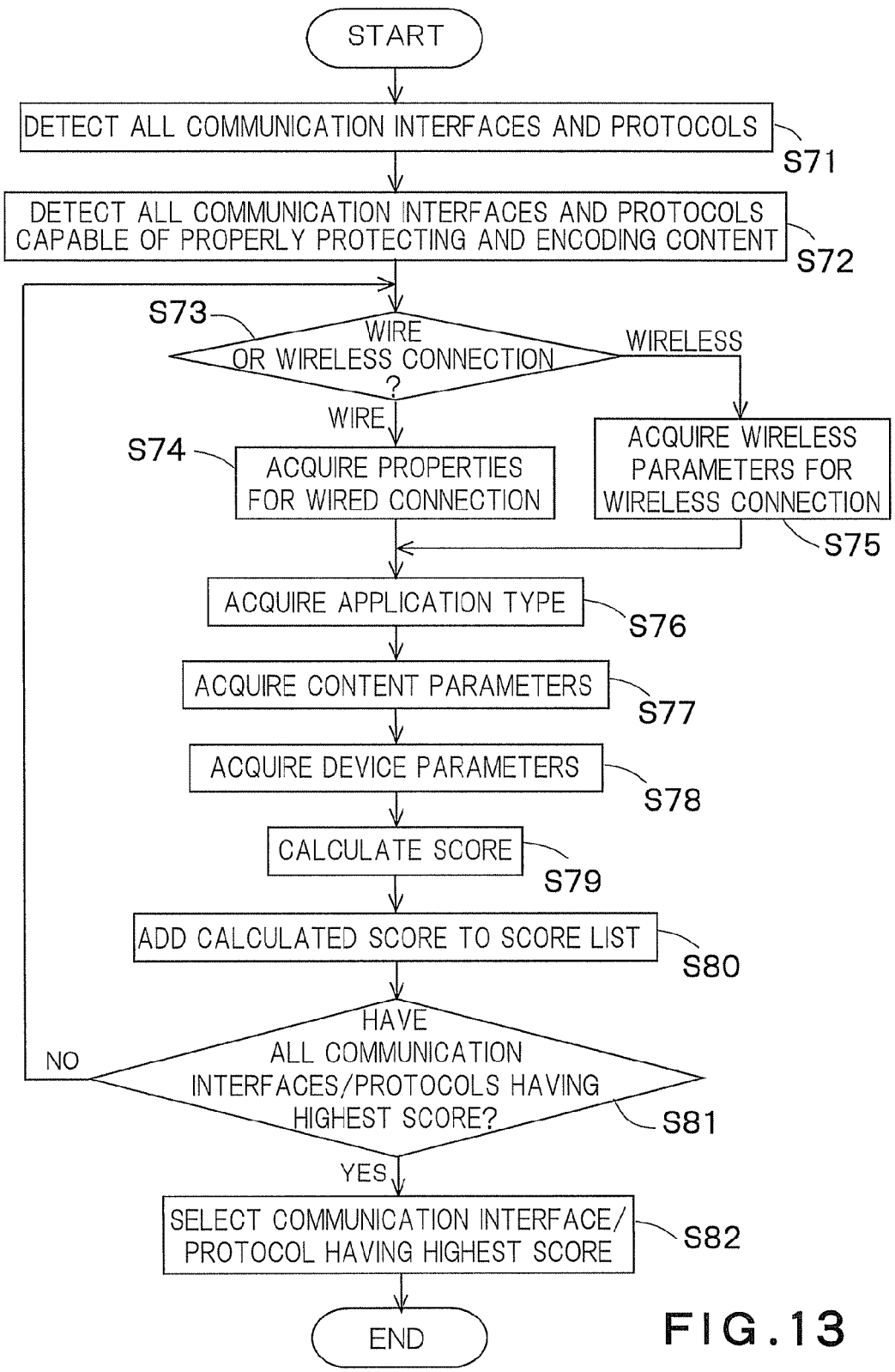
FIG. 13 A flow chart showing an example of the operating procedure performed by the policy engine 7 or 18 to determine a specific communication interface or protocol.

FIG. 13 is a flow chart showing an example of the operating procedure performed by the policy engine 7 or 18 to determine a specific communication interface or protocol. The process of FIG. 13 may be performed by any one of the communication device 1 and communication partner device 11. Hereinafter, explanation will be given on an example where the policy engine 7 in the communication device 1 performs the process of FIG. 13.

First, the communication system detector 31 detects all communication interfaces and protocols available to transfer content between the communication device 1 and communication partner device 11 (Step S71). The available communication interfaces are HDMI, MHL, etc. Further, the available protocols are DLNA (Digital Living Network Alliance), Miracast, etc.

Next, the content judging unit 32 judges whether each of the detected communication interfaces and protocols can properly protect and encode the content (Step S72). Then, the content judging unit 32 extracts all communication interfaces and protocols capable of properly protecting and encoding the content (Step S72).

Next, the wired/wireless connection judging unit 36 judges whether each of the communication interfaces and protocols extracted at Step S72 corresponds to a wired connection or a wireless connection (Step S73). The reason why this judgment is required is that parameters for determining the performance of wired transfer are different from parameters for determining the performance of wireless transfer.

In the case of wired connection, the communication configuration information acquisition unit 37 acquires properties such as transfer speed when transferring the content through the wired connection, data format of the content, etc. (Step S74). When the communication interface of the wired connection is HDMI for example, EDID (Extended Display Identification Data) should be acquired to confirm detailed performance of the HDMI port. The same can be applied when the communication interface is MHL. In the case of wireless connection, the communication configuration information acquisition unit 37 acquires wireless parameters for wirelessly transferring the content (e.g., transfer speed, bandwidth, jitters, interference, frame rate loss, etc.) (Step S75).

After Step S74 or S75 is completed, the policy engine 7 acquires an application type expected by the user (Step S76). There are various types of applications such as an application for mirroring the screen of the source device and an application for selecting and playing content stored in the source device. Mirroring of the screen is realized by an application utilizing HDMI, MHL, or Miracast, and selecting and playing the content is realized by an application utilizing DLNA.

Next, the policy engine 7 acquires content parameters (Step S77). Here, the content parameters relate to live streaming time, file playing, file size, encoder compression rate, application type, etc.

Next, the policy engine 7 acquires device parameters of the communication device 1 and communication partner device 11 (Step S78). The device parameters relate to size, resolution, etc. of the display of each device. The device parameters should be previously acquired since the optimum communication interface or protocol for displaying content on the display of a portable device are different from the optimum communication interface or protocol for displaying content on the display of a 4K- or 2K-compatible W. Note that the order of Steps S74 to S78 may be arbitrarily changed.

Next, the policy engine 7 calculates a score for each of the communication interfaces and protocols considering various information acquired at Steps S74 to S78 (Step S80). The calculated score is added to a score list (Step S80).

Next, the policy engine 7 judges whether Steps S73 to S80 have been performed on each of the communication interfaces and protocols extracted at Step S72 (Step S81). If there is any communication interface or protocol which has not been treated yet, Step S73 and subsequent steps are repeated. When the steps are completed on all of the communication interfaces and protocols, the communication system selector 34 selects any one communication interface or protocol having the highest score for each use case (Step S82).

Note that the priority of the communication interface or protocol to be finally selected at Step S82 can be changed programmably depending on each use case.

Transfer speed of a wired interface such as HDMI and MHL is thousands of megabits per second, which is far faster than the transfer speed of the fastest wireless protocol (e.g., IEEE 802.11n). On the other hand, transfer speed of a wireless interface is hundreds of megabits per second. Accordingly, when selecting a communication interface or protocol for transferring AV data, wired communication interfaces and protocols are more likely to be prioritized than wireless communication interfaces and protocols. However, the wired communication interface is not necessarily selected depending on communication environment etc.

For example, suppose a case where the source device has 4K content but its decoder is compatible only to 2K. In this case, the source device is connected to the sync device through HDMI and DLNA. HDMI is used to transmit data decoded by the source device to the sync device. When the decoder of the source device is compatible only to 2K, 4K content is transferred to the sync device as data having 2K resolution.

If the sync device has a 4K-compatible decoder, DLNA can be selected to transfer undecoded 4K content to the sync device as the original compressed data. The sync device decodes the 4K content using the 4K-compatible decoder to play the content with 4K resolution.

As stated above, concrete communication interface or protocol to be selected should be determined depending on each use case considering communication environment, performance of the source device and sync device, etc.

However, this does not reduce the need to give a score to each communication interface or protocol. The scoring is required to make a better selection from wireless protocols and wired interfaces. For example, when HDMI and MHL can be used as the communication interfaces between the source device and sync device, transfer speed of each communication interface is referred to determine which is optimum for transferring content. Similarly, when only wireless protocols are available, the optimum protocol is selected depending on the application to be required. That is, when an application for mirroring the screen of the source device is required, a protocol such as Miracast is selected. When an application for selecting and playing content is required, DLNA is selected.

After the specific communication interface or protocol for transferring content is selected by performing the process of FIG. 13, available communication interfaces and protocols may possibly be changed for any reason. For example, suppose a case where a wired interface such as HDMI which is unavailable in the initial state becomes available at a certain point after another communication interface or protocol such as Miracast is selected to transfer content. In this case, the communication interface is changed to HDMI since selecting HDMI realizes increase in transfer speed and content play with high quality.

Figure 14:
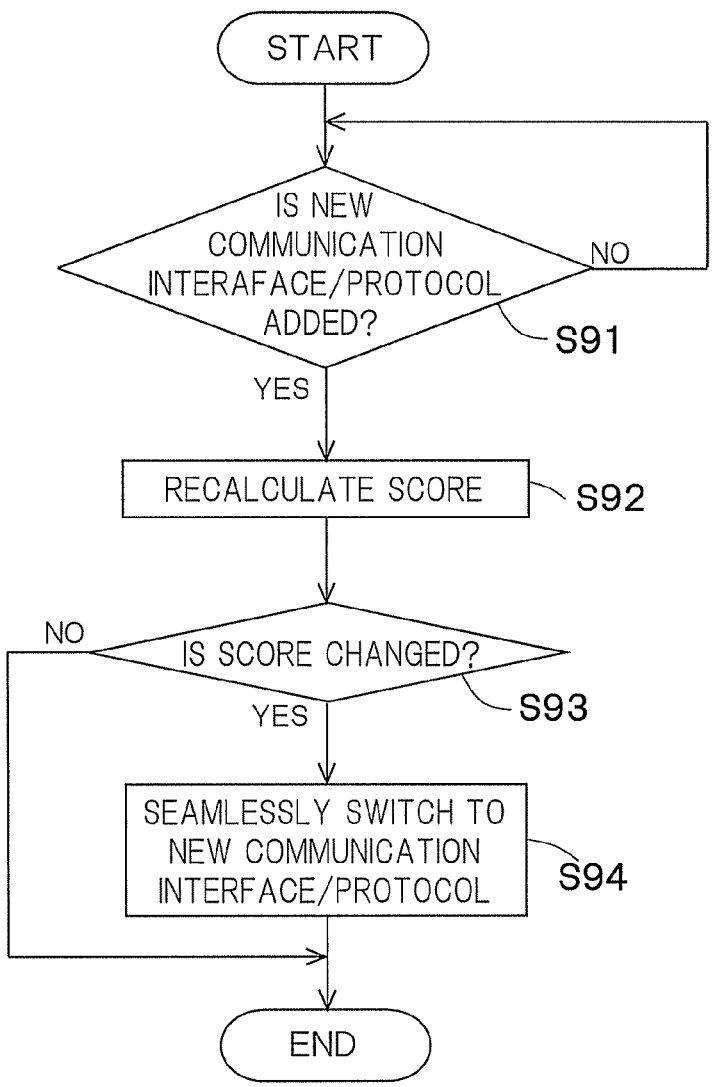
FIG. 14 A flow chart showing an example of the operating procedure when communication interfaces and protocols are changed.

The operating procedure performed in this case can be shown as a flow chart of FIG. 14, for example. The process of FIG. 14 may be performed by any one of the communication device 1 and communication partner device 11. In the example to be explained below, the process of FIG. 14 is performed by the communication device 1.

First, it is judged whether a new communication interface or protocol is added (Step S91). If added, the score for each of the communication interfaces and protocols capable of properly protecting and encoding content is recalculated (Step S92). Note that Steps S91 and S92 are performed also when the communication interface or protocol is disconnected. Next, it is judged whether the recalculated score is changed from the original score (Step S93). If the score is changed, the score list is updated, and the communication interface or protocol having a score optimum for each use case is selected based on this score list, to seamlessly switch from the original communication interface or protocol to the new communication interface or protocol (Step S94).

As stated above, in the present embodiment, specific information is shared between the communication device 1 and communication partner device 11 connected through a specific communication interface such as HDMI and MHL, and a packet including the specific information is broadcasted through the network 9. Each device receives this packet and judges whether the specific information included in the packet matches the specific information previously obtained by itself, to identify the device connected thereto through the specific communication interface. Accordingly, even when the address assigned by the communication interface is not a unique address, the communication partner device connected to the communication interface can be properly identified.

Further, in the present embodiment, all communication interfaces and protocols available for the connection between the communication device 1 and communication partner device 11 are detected to extract therefrom communication interfaces and protocols capable of properly protecting and encoding content. Further, a score is given to each of the available communication interfaces and protocols considering wired/wireless connection, application type, content parameters, device parameters of the communication device 1 and communication partner device 11, etc., to determine, based on the score, a communication interface or protocol optimum for each use case. Accordingly, the optimum communication interface or protocol can be automatically selected depending on communication environment, type of the content to be transferred, etc., by which the user is free from the task of selecting a communication interface etc. by himself. Further, when communication environment is changed, a new communication interface or protocol is selected, which reflects the change in the communication environment promptly.

According to the present embodiment, even when a plurality of communication interfaces and protocols are selectable for the connection between the communication device 1 and communication partner device 11, the user is not required to select one of them, which improves the convenience of the user. In particular, it is not easy for a general user, who does not grasp the details of the respective communication interfaces and protocols such as HDMI, DLNA, Miracast, and MHL, to select the optimum communication interface or protocol by himself. According to the present embodiment, it is possible to quickly make optimum selection to fully make use of the functions of these communication interfaces and protocols.

Further, selecting the specific communication interface or protocol considering communication environment, device parameters of the communication device 1 and communication partner device 11, content type, etc. prevents the deterioration in content due to the communication interface or protocol inappropriately selected. Particularly, according to the present embodiment, since the parameters relating to content quality are taken into consideration to finally select the communication interface or protocol, deterioration in the original content quality can be prevented.

At least a part of the communication device 1 explained in the above embodiments may be formed of hardware or software. In the case of software, a program realizing at least a partial function of the communication device 1 may be stored in a recording medium such as a flexible disc, CD-ROM, etc. to be read and executed by a computer. The recording medium is not limited to a removable medium such as a magnetic disk, optical disk, etc., and may be a fixed-type recording medium such as a hard disk device, memory, etc.

Further, a program realizing at least a partial function of the communication device 1 can be distributed through a communication line (including radio communication) such as the Internet. Furthermore, this program may be encrypted, modulated, and compressed to be distributed through a wired line or a radio link such as the Internet or through a recording medium storing it therein.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

REFERENCE SIGNS LIST 1 communication device, 2 communication interface, 3 connection detector, 4 specific information acquisition unit, 5 packet generator, 6 broadcaster, 7 policy engine, 8 disconnection detector, 11 communication partner device, 12 communication interface, 13 connection detector, 14 specific information acquisition unit, 15 packet receiver, 16 specific information judging unit, 17 specific information storage, 18 policy engine, 19 disconnection detector, 31 communication system detector, 32 content judging unit, 33 priority setting unit, 34 communication system selector, 35 content transfer unit, 36 wired/wireless connection judging unit, 37 communication configuration information acquisition unit.

The invention claimed is:

1. A communication apparatus comprising:
a communication interface conforming to a first standard; and
processing circuitry configured to:
detect whether the communication apparatus is connected to a first communication apparatus via the communication interface;
acquire first time information related with a timing of a connection between the communication apparatus and the first communication apparatus;
generate a first packet including the first time information;
broadcast the first packet;
receive a second packet including second time information from the first communication apparatus;
determine whether the second time information matches the first time information; and
discard the second packet when the second time information does not match the first time information, and
store information of a correspondence relationship between the first communication apparatus and the communication interface when the second time information matches the first time information.

2. The communication apparatus of claim 1, wherein the first and second time information comprises absolute time information.

3. The communication apparatus of claim 1, wherein the second time information comprises time information managed by the first communication apparatus and received from the first communication apparatus through the communication interface.

4. The communication apparatus of claim 3, wherein the second time information comprises time information transmitted from the first communication apparatus through the communication interface, as a response to a user-defined command complying to the first standard.

5. The communication apparatus of claim 1, wherein the second packet comprises message information transmitted from the first communication apparatus through the communication interface, as a response to a user-defined command complying to the first standard.

6. The communication apparatus of claim 1, wherein the processing circuitry is configured to detect whether the connection with the first communication apparatus via the communication interface is disconnected,
the first time information is acquired when a disconnection from the first communication apparatus is detected,
the first packet is generated to include the first time information when the disconnection from the first communication apparatus is detected, and
the first packet is broadcasted when the disconnection from the first communication apparatus is detected.

7. The communication apparatus of claim 6, wherein the processing circuitry is configured to store the first time information in an information storage, and
the first time information is read out from the information storage when the disconnection from the first communication apparatus is detected.

8. The communication apparatus of claim 1, wherein the processing circuitry is configured to:
detect all communication interfaces and protocols available to transfer content to the first communication apparatus;
select each of the detected communication interfaces and protocols to determine whether the selected communication interface or protocol can properly protect and encode the content to be transferred to the first communication apparatus;
set priorities on the determined communication interfaces and protocols to be able to properly protect and encode the content to be transferred to the first communication apparatus;
select, based on the priorities, one of the determined communication interfaces and protocols to be able to properly protect and encode the content; and
transfer the content to the first communication apparatus via the selected communication interface or protocol.

9. The communication apparatus of claim 8, wherein the processing circuit is configured to:
determine whether the content should be transferred through a wired connection or a wireless connection; and
acquire communication configuration information suitable for the wired or wireless connection, based on a determination of whether the content should be transferred through a wired connection or a wireless connection
wherein the priorities are set based on the communication configuration information.

10. The communication device of claim 9, wherein the priorities are set based on at least one of an application type, a content type, and performance of the communication device and the first communication apparatus.

11. A communication method comprising:
- detecting whether a communication device is connected to a first communication apparatus, via a communication interface conforming to a first standard;
- acquiring first time information related with a timing of a connection between a communication apparatus and the first communication apparatus, when a connection with the first communication apparatus is detected
- generating a first packet including the first time information;
- broadcasting the first packet;
- receiving a second packet including second time information from the first communication apparatus;
- determining whether second time information included in the second packet matches the acquired first time information; and
- discarding the received packet when determined that the second time information does not match the acquired information, and
- storing information on a correspondence relationship between the first communication apparatus and the communication interface when determined that the second time information matches the acquired first time information.

12. The communication method of claim 11, wherein the second packet information comprises message information transmitted from the first communication apparatus through the communication interface, as a response to a user-defined command complying to the first standard.

13. The communication method of claim 11, further comprising:
- detecting by a disconnection detector configured to detect whether the connection with the first communication apparatus via the communication interface is disconnected,
- wherein the first time information is acquired when a disconnection from the first communication apparatus is detected,
- the first packet is generated to include the first time information when the disconnection from the first communication apparatus is detected, and
- the generated first packet is broadcasted when the disconnection from the first communication apparatus is detected.

14. The communication method of claim 13, further comprising:
- storing the acquired first time information,
- wherein the stored first time information is read out when the disconnection from the first communication apparatus is detected.

15. The communication method of claim 11, further comprising:
- detecting all communication interfaces and protocols available to transfer content to the first communication apparatus;
- selecting each of the detected communication interfaces and protocols to determine whether the selected communication interface or protocol can properly protect and encode the content to be transferred to the first communication apparatus;
- setting priorities on respective communication interfaces and the determined protocols to be able to properly protect and encode the content to be transferred to the first communication apparatus;
- selecting, based on the priorities, one of the determined communication interfaces and protocols to be able to properly protect and encode the content; and
- transferring the content to the first communication apparatus using the selected communication interface or protocol.

16. The communication method of claim 15, further comprising:
- determining whether the content should be transferred through a wired connection or a wireless connection; and
- acquiring communication configuration information suitable for the wired or wireless connection, based on a determined result,
- wherein the priorities is set based on the communication configuration information.

17. The communication method of claim 16, wherein the priorities are set based on at least one of an application type, a content type, and performance of the communication device and the first communication apparatus.

* * * * *